United States Patent
Diab et al.

(10) Patent No.: US 7,472,290 B2
(45) Date of Patent: Dec. 30, 2008

(54) METHODS AND APPARATUS TO MAINTAIN AND UTILIZE MOBILE POWER PROFILE INFORMATION

(75) Inventors: Wael William Diab, San Francisco, CA (US); Matthew A. Laherty, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 498 days.

(21) Appl. No.: 11/071,971

(22) Filed: Mar. 4, 2005

(65) Prior Publication Data

US 2006/0143583 A1 Jun. 29, 2006

Related U.S. Application Data

(63) Continuation-in-part of application No. 11/021,151, filed on Dec. 23, 2004.

(51) Int. Cl.
G06F 1/26 (2006.01)
(52) U.S. Cl. .................. 713/300; 713/300; 713/320; 714/14
(58) Field of Classification Search ............ 713/300, 713/320, 324, 330, 340; 455/402; 714/14
See application file for complete search history.

(56) References Cited

U.S. PATENT DOCUMENTS

| | | | | |
|---|---|---|---|---|
| 4,467,314 A | * | 8/1984 | Weikel et al. | 700/295 |
| 4,528,667 A | * | 7/1985 | Fruhauf | 714/809 |
| 4,692,761 A | * | 9/1987 | Robinton | 340/825.01 |
| 4,733,389 A | * | 3/1988 | Puvogel | 370/200 |
| 5,550,917 A | | 8/1996 | Tallec | 379/442 |
| 5,625,621 A | | 4/1997 | Christensen et al. | 370/248 |

(Continued)

FOREIGN PATENT DOCUMENTS

EP 0 777 357 A2 4/1997

(Continued)

OTHER PUBLICATIONS

Galit Mendelson, "Installing an IP Telephony Network Using Power over LAN", Online, (Nov. 3, 2002) pp. 1-10, XP002340946 Inet, Retrieved from the Internet: URL: http://ww.powerdsine.com/Documentation/WhitePapers/Installing_IP_Telephony_network_with_PoL.pdf> retrieved on Aug. 16, 2005, p. 7, line 16-line 19.

(Continued)

*Primary Examiner*—Chun Cao
(74) *Attorney, Agent, or Firm*—BainwoodHuang

(57) ABSTRACT

A controller in PSE (Power Sourcing Equipment) controls how to provision uninterruptible power through corresponding data ports (and cables) of the PSE to network devices. For example, the controller receives power profile information associated with the network devices indicating how to provision power to the network devices during a power failure such as when an uninterruptible power supply providing power to the power sourcing equipment runs on a battery rather than failed primary wall power. In response to detecting a power failure condition, the power sourcing equipment provisions power to the network devices based on the power profile information associated with the network devices. Consequently, the PSE can smartly provision power to more critical network devices while in a power failure mode rather than provision power to the network devices in the same way before and after occurrence of the power failure mode.

20 Claims, 9 Drawing Sheets

U.S. PATENT DOCUMENTS

| | | | |
|---|---|---|---|
| 5,642,052 A | 6/1997 | Earle | 324/556 |
| 5,670,937 A | 9/1997 | Right et al. | 340/506 |
| 5,680,397 A | 10/1997 | Christensen et al. | 370/421 |
| 5,784,237 A | 7/1998 | Velez | 361/62 |
| 5,912,963 A | 6/1999 | Begeja et al. | 379/221 |
| 5,936,442 A | 8/1999 | Liu et al. | 327/142 |
| 6,040,969 A | 3/2000 | Winch et al. | 361/82 |
| 6,098,174 A | 8/2000 | Baron et al. | 713/300 |
| 6,233,235 B1 | 5/2001 | Burke et al. | 370/356 |
| 6,317,839 B1 | 11/2001 | Wells | 713/320 |
| 6,345,047 B1 | 2/2002 | Regnier | 370/352 |
| 6,357,011 B2 | 3/2002 | Gilbert | 713/300 |
| 6,473,608 B1 * | 10/2002 | Lehr et al. | 455/402 |
| 6,546,494 B1 | 4/2003 | Jackson et al. | 713/300 |
| 6,629,248 B1 | 9/2003 | Stachura | 719/340 |
| 6,674,271 B2 | 1/2004 | Choo et al. | 323/282 |
| 6,701,443 B1 | 3/2004 | Bell | 713/300 |
| 6,874,093 B2 | 3/2005 | Bell | 713/300 |
| 6,952,785 B1 | 10/2005 | Diab et al. | 713/300 |
| 2003/0135766 A1 | 7/2003 | Syskowski et al. | 713/300 |
| 2004/0025066 A1 | 2/2004 | Jackson et al. | 713/300 |
| 2004/0041697 A1 * | 3/2004 | Nattkemper et al. | 340/310.01 |
| 2005/0262364 A1 | 11/2005 | Diab et al. | 713/300 |
| 2005/0283627 A1 | 12/2005 | Diab et al. | 713/300 |
| 2006/0041767 A1 * | 2/2006 | Maxwell et al. | 713/323 |
| 2006/0133368 A1 * | 6/2006 | Tolliver | 370/389 |

FOREIGN PATENT DOCUMENTS

| | | |
|---|---|---|
| GB | 2 034 055 A | 5/1980 |
| JP | 200214964 A | 8/2000 |

OTHER PUBLICATIONS

International Search Report for PCT/US2005/013365, Search completed Aug. 17, 2005, 3 pages.

* cited by examiner

| NETWORK DEVICE | PRIORITY CLASS FOR PROVIDING POWER IN BACKUP POWER MODE | BACKUP POWER TIME | POWER CONSUMPTION REQUIREMENTS |
|---|---|---|---|
| ND #1 | 2 | 1 HOUR | 150 WATTS |
| ND #2 | N/A | N/A | N/A |
| ND #3 | 5 | 5 MINUTES | 220 WATTS |
| ... | ... | ... | ... |

CONTROL INFORMATION 450

FIG. 6

METHODS AND APPARATUS TO MAINTAIN AND UTILIZE MOBILE POWER PROFILE INFORMATION

RELATED APPLICATION

This application is a Continuation-In-Part (CIP) of earlier filed U.S. patent application Ser. No. 11/021,151 entitled "METHODS AND APPARATUS FOR PROVISIONING UNINTERRUPTIBLE POWER FOR POWER OVER ETHERNET APPLICATIONS," filed on Dec. 23, 2004, the entire teachings of which are incorporated herein by this reference.

BACKGROUND

A typical Power over Ethernet (PoE) power communications system includes power-sourcing communications equipment (PSE) and a set of remotely-powered network devices (e.g., PDs or Powered Devices) that connect to the power-sourcing communications equipment through network cables. Power-sourcing communications equipment can include i) power supply circuitry to provide power through a cable to a respective network device and ii) transmit/receive circuitry to support data communications with a respective network device at the other end of a cable. Accordingly, when supplied power through the cable, a user of the respective network device is not burdened with having to separately connect his network devices to another power source such as a 115 volt wall outlet or convert AC to DC if a DC supply is necessary. Instead, the network device coupled to a port of the power-sourcing communications equipment relies on power received through the cable.

There are industry standards which attempt to provide guidelines for manufacturing certain types of power-sourcing communications equipment. For example, the IEEE 802.3af standard, which is also called the "Power over Ethernet" standard, defines ways to build Ethernet power-sourcing equipment and powered devices. In particular, the IEEE 802.3af standard identifies ways to deliver certain electrical features (e.g., 48 volts) of DC power over unshielded twisted-pair wiring (e.g., Category 3, 5, 5e or 6 network cables, patch cables, patch-panels, outlets and connecting hardware) to a variety of Ethernet devices such as IP phones, wireless LAN access points, laptop computers, web cameras, etc.

In the context of the IEEE 802.3 Ethernet Standard, which does not cover UPS applications and is limited to PSE and PD interactions, the power-sourcing communications equipment discussed above is referred to a Power Sourcing Equipment (PSE) and network devices coupling to the PSE (e.g., a switch device) through cables are known as Powered Devices (PDs).

According to one conventional technique, a PSE receives power from a power source such as an Uninterruptible Power Supply (UPS) that produces power based on primary power and, when needed, backup power. When the primary power (e.g., 115 or 230 volts or a DC voltage) fails due to a power outage, the power source relies on the backup power (e.g., power from capacitors, batteries, generator, etc.) to provide continued and uninterrupted power to the PSE. Preferably, the power source can transition to a use of the backup power so quickly that there is no interruption of power provided from the power source to the PSE. Consequently, the PSE can provide continuous power through cables to the associated PDs even during a power outage. Accordingly, some VoIP (Voice Over IP) phone systems, base stations that support wireless PD devices (such as those based on communication standard 802.11) and other PDs include a central switch configured to provide power through cables to the end devices (e.g., PDs such as VoIP phones, 802.11 base stations etc.) thus alleviating the need for PDs that require power under all circumstances (uninterrupted power) to have separate individual power supplies and/or separate individual power backup systems.

SUMMARY

Many of the advantages and much of the innovation behind PoE systems is based upon the flexibility of moving end devices (e.g., PDs or Powered Devices) attached to ports of a PSE across a network. For example, a user can unplug an end device such as a VoIP phone from one port of a network switch (e.g., PSE) and plug the end device into another port of the same or different network switch without having to notify a system administrator or technician to reconfigure the impacted portion of the network. The network switch supports communications on behalf of the end device no matter which port of the network switch the end device is connected. In a similar vein as the VoIP phone discussed above, other types of PDs such as wireless base stations can be plugged into to different ports of a PSE to support more convenient or more "radio efficient" locations in a building.

In contrast, with respect to legacy PBX systems, a PBX system would have to be reconfigured to allow for an associated phone to move from one location to another, while retaining the same phone number and physical properties. The seamless mobility of PoE systems, therefore, is both convenient to the user and cost effective for owners of such systems since minimal, if any, human effort is required to reconfigure an end device or system in general to operate at a new location versus an old location.

Unfortunately, according to conventional employment of PoE techniques, the benefit of being able to seamlessly move an end device from one port of a PSE to another with minimal human intervention becomes overshadowed and/or impossible by drawbacks that arise when a conventional PSE (e.g., a network switch as discussed above) providing power to the end devices is fed by a power backup system such as a UPS (Uninterruptible Power Supply) that provides continuous power during a power failure. From this perspective, there are many deficiencies associated with conventional PoE techniques.

For example, one deficiency of conventional PoE techniques is that the topology of an entire network has to be known so that an end device that requires backup power (e.g., continuous power from a PSE even though the PSE operates on a UPS running on battery backup) is moved only from a switch that is backed up by a UPS to another switch that is also backed up by a UPS. This ensures that an end device can be provided continuous power even during a power failure when the UPS runs on backup power to power the PSE.

Another deficiency of conventional PoE techniques is that detailed information about capacity of a UPS relative to the PSE's power supply capacity has to be known on the new PSE/UPS system to which the device is moving so that the new PSE/UPS can accommodate the higher backup load. Note that capacity of a UPS may not always be able to provide continuous power to a PSE. This may be intentional due to prioritization of certain devices/ports over others, or unintentional due to perhaps a human error occurring when reconfiguring the system.

Yet another deficiency of conventional PoE techniques is the inability of a system to validate and authenticate a device's identity and power backup needs to allow for seamless mobility of an end device from one PSE to another.

Still another deficiency of conventional PoE techniques is that other power backup properties and/or parameters that may be specific to an individual end device (e.g., PD), which is different than properties/parameters for other PDs, has to be manually conveyed from the user/PD to the system administrator and/or then manually transcribed from one PSE (e.g., a network switch) to another. Examples of such parameters are the amount of power needed for backup (if it is different in backup mode vs. an operational mode), backup priority, acceptable power downtime, inrush requirements, as well as many others.

Techniques of the invention deviate with respect to conventional PoE applications as discussed above as well as additional techniques also known in the prior art. In general, to overcome the above-mentioned and/or other unmentioned deficiencies, there are two broad aspects of the present invention including: (a) the properties that are associated with the profile and (b) the actual method of authentication and information exchange. More particularly, a "mobile" power profile according to an embodiment of the present invention includes power requirements information associated with network devices coupled to ports of a PSE. The power requirements information identifies how the PSE is to provision power to respective ports and thus respective network devices such as during different operating conditions (e.g., during a power outage, during normal operating conditions, etc.).

In one application, the power profile information associated with a given network device includes a parameter identifying how to apply power during a power failure mode such as when a UPS providing power to the PSE switches to running on a backup power source (e.g., a battery). The acceptable power required by a network device from the PSE during a power failure can be less than during a normal operating mode of the PSE. Thus, such a "backup power" parameter of the power profile information enables the PSE to provide different power levels to the network devices depending on operating conditions.

The power profile information can include another parameter (not necessarily related to a power failure mode) such as acceptable recovery time, which relates to whether a network device requires continuous "glitch-less" power or whether the network device can tolerate at least temporary downtime (e.g., seconds, minutes, hours) when the PSE can discontinue supplying power to a respective network device. As an example, a network device such as an emergency phone coupled to the PSE typically would typically require continuous power while it may be acceptable to discontinue providing power from the PSE to a wireless data base station. The power profile information captures these acceptable power conditions. Use of this parameter enables the PSE to reduce instantaneous load requirements on the UPS when aggregated amongst other network devices. The instantaneous load is often another limiting and cost determining factor of the UPS system in addition to its more traditional battery capacity. In other words, this parameter enables configuration of the PSE to gradually provide power to multiple network devices.

A "mobile" power profile can further include information such as a backup power classification or priority associated with a respective network device. The class to which a network device belongs can indicate a type of power to be applied to the network device during a main power failure. For example, the class can identify what action (e.g., whether to continue to provide power or discontinue providing power) a PSE shall take when learning that a UPS providing power to the PSE switches to running on a battery backup rather than standard wall power. Classifying the network devices reduces a burden on the PSE of having to treat each network device differently because the PSE treats each member of a class of network devices in a similar manner. For example, classification according to embodiments herein allows the UPS/Switch to prioritize all the network devices according to an algorithm that allows a more optimal use of the limited and extremely valuable resource of the UPS: the battery life. That is, the UPS/switch can utilize the classification information associated with network devices to selectively depower the network devices during a power outage condition when the UPS providing power to the switch runs on battery backup. This is discussed in more detail in related U.S. patent application Ser. No. 11/021,151 entitled "METHODS AND APPARATUS FOR PROVISIONING UNINTERRUPTIBLE POWER FOR POWER OVER ETHERNET APPLICATIONS," filed on Dec. 23, 2004. Automating communication of the power profile information enables flexibility of moving powered devices amongst different locations of a network without a loss of appropriate backup power to the powered devices during a power failure event.

One event prompting the PSE to discover power profile information associated with a network device is the act of a user plugging a network device into a port of the PSE. In response to such an event, the PSE automatically utilizes one or more communication protocols (e.g., the 802.3af communication protocol, a company specific communication protocol, etc.) to discover whether the network device requires power over a respective port to which the network device is coupled. If appropriate, after discovery, the PSE supplies power to a newly connected network device. Thereafter, the PSE communicates via (a) Ethernet Frames uniquely identifying the end device (PD) by its MAC address, (b) CDP (Cisco Discovery Protocol), (c) other protocol, or (d) other IP based information that is unique to the device to authenticate the device, validate its properties, and/or learn of a respective power profile associated with respective network device.

Depending on a particular network system configuration, the PSE can "pull" the power profile information from different sources (or alternatively, these devices can push the information to a power sourcing equipment). For example, in one embodiment, network devices (e.g., PDs), coupled to ports of the PSE, locally store their own "mobile" power profile information. In one application, to setup the network device, a user enters his/her backup profile into a respective PD. For example, the user enters his/her backup profile into a website that can automatically reprogram a respective PD. A backup profile can be programmed in a factory, distributor, a network administrator, etc.

In one embodiment, the PSE reads the power profile information when the respective network device is connected to a PSE port. For example, the PSE retrieves the power-backup profile associated with a respective network device from the network device to determine what power to provide the respective network device under different backup conditions and scenarios. For example, as discussed above, certain parameters of the power profile information can indicate how to apply power to a respective network device during a main power failure when the UPS feeding power to the PSE runs off a backup power source such as a battery. Maintaining the power profile information in each of multiple network devices in the above manner ensures that the PSE can find respective mobile power profiles because, to learn of power profile information of the network devices, the PSE needs only to communicate directly with the network devices.

In another embodiment, power profile information resides in a centralized network location such as a policy server directly or indirectly accessible by the PSE. In this latter case, the PSE communicates with the policy server to retrieve power profile information associated with the network devices attached to ports of the PSE. Thus, power profile information need not be stored locally with respect to a network device. The policy server can receive the power profile information in a number of ways. For example, in one application, a network administrator enters the power profile information into a server at a centralized location in a network. In another application, the user enters his/her backup profile into a website that is linked to download power profile information associated with a network device to the centralized server.

Regardless of whether a PSE pulls power profile information from a network device, a policy server, or the PD device itself, or some other repository, use of power profile information enables a user to plug into different ports of a potentially expansive network including one or more PSEs while still being provided appropriate power during different conditions. This technique of configuring a PSE to dynamically provision power to its ports based on learned power profile information of one or more end devices reduces recurring network administration costs because a network administrator no longer needs to manually reprogram how a PSE shall provide power (e.g., during a power failure) to its respective ports each time a user plugs a network device into a different port. Instead, the PSE utilizes the power profile information associated with network devices to identify how to provision power from the PSE to the attached network devices.

As discussed, power profile information associated with a network device, user, (or other entity) can be stored in a repository such as in the network device itself (e.g., the PD) or in a network server. One way of identifying a particular network device coupled to a port of the PSE is to learn its unique identifier such as a MAC address (which is unique to every device), a unique static IP address, assigned key that may be granted by an administrator after an initial approval of the power backup profile.

Based on learning a unique identifier associated with a network device when it is plugged into a PSE, the PSE then communicates with a repository of a respective network device or a network server to retrieve the power profile information. For example, according to one embodiment, the PSE initially communicates with the network device to learn of its MAC address. Thereafter, the PSE utilizes the MAC address to retrieve a respective power profile associated with the network device from the network server and provision power. A network administrator can place the network devices' MAC address on a list that is shared throughout the network. This list can define members of a VLAN (Virtual Local Area Network) and respective member's power profile information. As an alternative to using the MAC address to identify an end device and retrieve appropriate power profile information for the end device, a higher layer communication protocol may be used between the PSE and PD such that a key exchange occurs. For example, the key exchange would be an alternative method in which a code, key, identifier, etc. is emailed to a user that programs his PD device with a received key. When the PD communicates with the PSE after an initial discovery phase (e.g., when the PSE discovers that a PD is connected to one of its ports), the PD sends an associated key to the PSE. The PSE receives the key from the PD and verifies the PD's programmed key for authentication purposes. Accordingly, a PSE can provide proper power to the PD based on use of authorized power profile information.

To summarize the last couple of paragraphs, there are four processes associated with a profile. For example, a first process involves receiving an initial request to accept a power profile. That is, a user requests a certain level of backup through a website, email, or manually programming. A network administrator then approves or denies the initial request for a backup profile. This is a "one time" event unlike conventional systems.

A second process involves authentication that occurs when a user plugs into a new port of a PSE. Authentication may be performed via the unique MAC address that was associated with the profile in the first process above, a special key that was given to the network device during the first process after approval of the profile, vlans, or another protocol, etc. In one sense, the main technique here is to provide a security check to ensure that the new network device attaching to the PE is who the corresponding network device claims to be or that the profile that will be later accessed by the PSE is authentic.

According to a third process, a power profile associated with a network device can be communicated to the switch in a number of ways. For example, a profile can be communicated from the PD to the PSE based on a protocol such as CDP (Cisco Discovery Protocol), MAC frames, IP, etc. A profile also can be downloaded from a central policy server programmed by an administrator. Also, a policy can be downloaded from a server that has been programmed by a user of the network device. Based on a profile of a network device attached to a switch port, the switch provides appropriate backup requirements.

According to a fourth process, when a network device is unplugged from a respective port of the switch, the switch no longer provides power to the respective port according to the profile. Conventional techniques such as those employed along with POE or PBX systems require manual disablement of the profile.

Further techniques of the invention include a policing mechanism and a validation/authentication mechanism. The policing mechanism prevents unauthorized access to programming of and retrieval of power profile information. For example, in one embodiment, the policing mechanism enables a network administrator to control who gets access to and can modify stored power profile information in a server. In another embodiment, the policing mechanism includes a password given to the user to enable the user to program power profile information into their PD.

The validation/authentication mechanism of the present invention supports authentication of a device and validation of its respective power profile properties for security purposes. For example, validation/authentication can be achieved based on use of an assigned password that is communicated to a user or MAC address of the device. Details of the validation/authentication mechanism can depend on how secure you would like the system to be. For example, if the network administrator wishes to prevent someone from deviously reprogramming their MAC address for the purpose of making an unauthorized change to their respective power profile information, it may be preferred to initiate use of a secure password provided by the user to authenticate and validate the device/user for a particular power profile information.

Techniques of the present application are well suited for use in relation to end devices attached to ports of a PSE such as a switch system. However, it should be noted that embodiments of the present application are not limited to use in such applications and can be used in wireless hub applications, digital web camera applications, etc. or any other PD/PSE systems employing Power over Ethernet (PoE) systems.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a diagram of power profile information used as control information to power network devices during a power failure according to an embodiment of the invention.

DETAILED DESCRIPTION

Among other embodiments, one embodiment of the invention is directed to techniques for provisioning power to ports of a switch based on power profile information associated with each of multiple network devices. For example, the controller receives power profile information associated with the network devices indicating how to provision power to the network devices during a power failure such as when an uninterruptible power supply providing power to the power sourcing equipment runs on a battery rather than failed primary wall power. In response to detecting a power failure condition, the power sourcing equipment provisions power to the network devices based on the power profile information associated with the network devices. Consequently, the PSE can smartly provision power to more critical network devices while in a power failure mode rather than blindly provision power to the network devices in the same way before and after occurrence of the power failure mode or some other condition.

Figure 1:
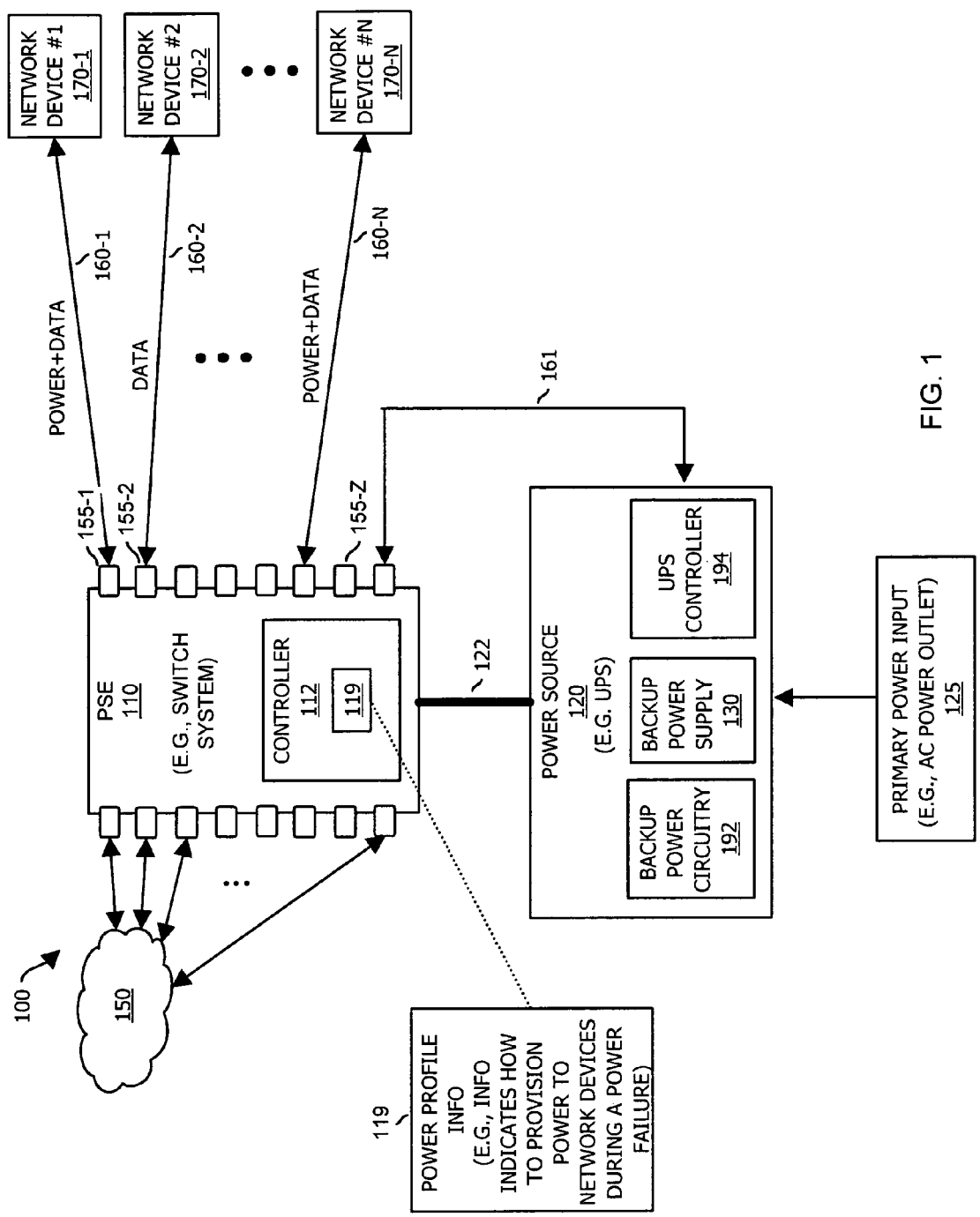
FIG. 1 is a block diagram of a system utilizing power profile information to provision power from power sourcing equipment to network devices during a power failure mode in which a power source supplying power to the power sourcing equipment runs on backup according to an embodiment of the invention.

FIG. 1 is a block diagram of an end-to-end Power over Ethernet (PoE) communication system 100 utilizing power profile information 119 according to an embodiment of the invention. As shown, communication system 100 includes network 150, power sourcing equipment 110 (e.g., one or more switch devices), network device 170-1, network device 170-2, . . . , network device 170-n (collectively network devices 170, some of which may be PDs that receive power from the PSE, others are simply non-PoE network elements such as devices that do not receive power from the power sourcing equipment 110), power source 120, which receives power from the primary power input 125, and the power source's backup power supply 130. Power sourcing equipment 110, such as a switch, includes port 155-1, port 155-2, . . ., port 155-z (collectively ports 155), and controller 112 that utilizes stored power profile information 119 to determine how to provision power to the network devices 170 during a power failure condition when power source 120 supplies power to power sourcing equipment 110 based on input from backup power supply 130 in lieu of primary power input 125. Link 160-1, link 160-2, . . . , link 160-n (collectively links 160), couple or connect ports 155 of power sourcing equipment 110 to network devices 170. Further, power source includes UPS controller 194 to control functions of power source 120 and backup power supply 130 to provide backup power from power source 120 to power sourcing equipment 110 during a power failure. Backup power circuitry 192 supports generation of power signal 122 to power PSE 110.

In connection with certain embodiments, there are two broad aspects of the present invention including: (a) the properties that are associated with the power profile information and (b) the actual method of authentication and information exchange. More particularly, a "mobile" power profile according to an embodiment of the present invention includes power requirements information associated with network devices 170 coupled to ports of a power sourcing equipment 110. The power profile information 119 identifies how the power sourcing equipment 110 is to provision power to respective network devices 170 such as during different operating conditions (e.g., during a power outage, during normal operating conditions, etc.).

Power sourcing equipment 110 such as a switch device, a router device, etc. enables network devices 170 to communicate through respective ports 155 and respective links 160 (e.g., data links also potentially used to convey power) to network 150. In one embodiment, power sourcing equipment 110 supports data communications such as TCP/IP and Ethernet communications. Note that as shown in FIG. 1, not all network devices 170 receive power and data from PSE 110. For example, network device 170-2 does not receive power from PSE 110 but network device 170-2 does receive and transmit data over link 160-2. Network device 1701- and network device 170-N receive both power and data over respective links 160-1 and 160-2.

As briefly discussed, power source 120 provides power (e.g., uninterruptible power) to power sourcing equipment 110 via power signal 122. During normal conditions, power source 120 generates power signal 122 based on power received from primary power input 125. During a power failure when primary power input 125 (e.g., a 230 volt line) fails, power source 120 utilizes power from its backup power supply 130 (e.g., a limited battery backup source) to generate power signal 122 to power sourcing equipment 110. In one embodiment, transitioning from use of primary power input 125 to backup power supply 130 occurs so quickly that power supplied through power signal 122 is continuous. In other words, power sourcing equipment 110 receives continuous power from power source 120 regardless of whether a power outage occurs on primary power input 125.

As mentioned, in addition to providing data communications to network devices 170, power sourcing equipment 110 selectively provides power to certain ports 155 as well. During a failure on primary power input 125 (e.g., wall power received from an electric utility company), power source 120 notifies controller of the condition such as through communication link 161. In turn, when the failure occurs, controller 112 utilizes power profile information 119 to identify how to provision power to the network devices 170 during a course of the failure.

In one application, the power profile information 119 associated with a given network device 170-1 includes a parameter identifying how to apply power during a power failure mode such as when a UPS providing power to power sourcing equipment 110 switches to running on a backup power supply 130 (e.g., a battery). The acceptable power required by a network device 170-1 from power sourcing equipment 110 during a power failure can be less than during a normal operating mode of the power sourcing equipment 110. Thus, such a "backup power" parameter of the power profile information 119 for one or more of the network devices 170 enables the power sourcing equipment 110 to provide different types of power specifications to the network devices 170 depending on operating conditions.

The power profile information 119 can include another parameter (not necessarily related to a power failure mode) such as acceptable recovery time, which relates to whether a network device 170-1 (or other respective network device) requires continuous "glitch-less" power or whether the network device 170-1 can tolerate at least temporary downtime (e.g., seconds, minutes, hours) when the power sourcing equipment 110 can discontinue supplying power to a respective network device 110. As an example, a network device 170-1 such as an emergency phone coupled to the power sourcing equipment 110 typically would typically require continuous, uninterrupted power. On the other hand, it may be acceptable to discontinue providing power from the power sourcing equipment 110 to a network device 170 such as a wireless data base station. The power profile information 119 captures these acceptable power conditions. Use of this parameter enables the power sourcing equipment 110 to reduce instantaneous load requirements on the power source 120 (e.g., UPS) when aggregated amongst other network devices 170. In other words, this parameter enables the power sourcing equipment 110 to gradually provide power to multiple network devices 170 during a power failure mode rather than provide power to network devices 170 all at once.

Power profile information 119 (e.g., a "mobile" power profile) can further include information such as a backup power classification or priority associated with a respective network device 170-1. The class to which a network device 170-1 belongs can indicate a type of power to be applied to the network device 170-1 during a main power failure. For example, the class can identify what action (e.g., whether to continue to provide power or discontinue providing power) a power sourcing equipment 110 shall take when learning that a power source 120 providing power to the power sourcing equipment 110 switches to running on a backup power supply 130 (e.g., a battery) rather than standard wall power. Classifying the network devices 170 reduces a burden on the power sourcing equipment 110 of having to treat each network device 170-1 differently because the power sourcing equipment 110 can treat each member of a class of network devices 170 in a similar manner.

Automating communication of the power profile information throughout a network enables flexibility of moving powered network devices 170 amongst different locations of a network without a loss of appropriate backup power to the powered devices during a power failure event. In other words, power profile information can be unique to a respective network device and power sourcing equipment 110 can provide appropriate power to different network devices 170 no matter which ports 155 the network devices 170 are connected Also, conventional techniques require that power profile information be manually conveyed from a user/PD to a system administrator and/or then manually transcribed from one PSE (e.g., a network switch) to another PSE. According to the present application, the switches automatically learn of power profile information based on what network devices 170 are coupled to them. More specific techniques of the invention are further discussed with respect to FIG. 2 and other following figures.

Figure 2:
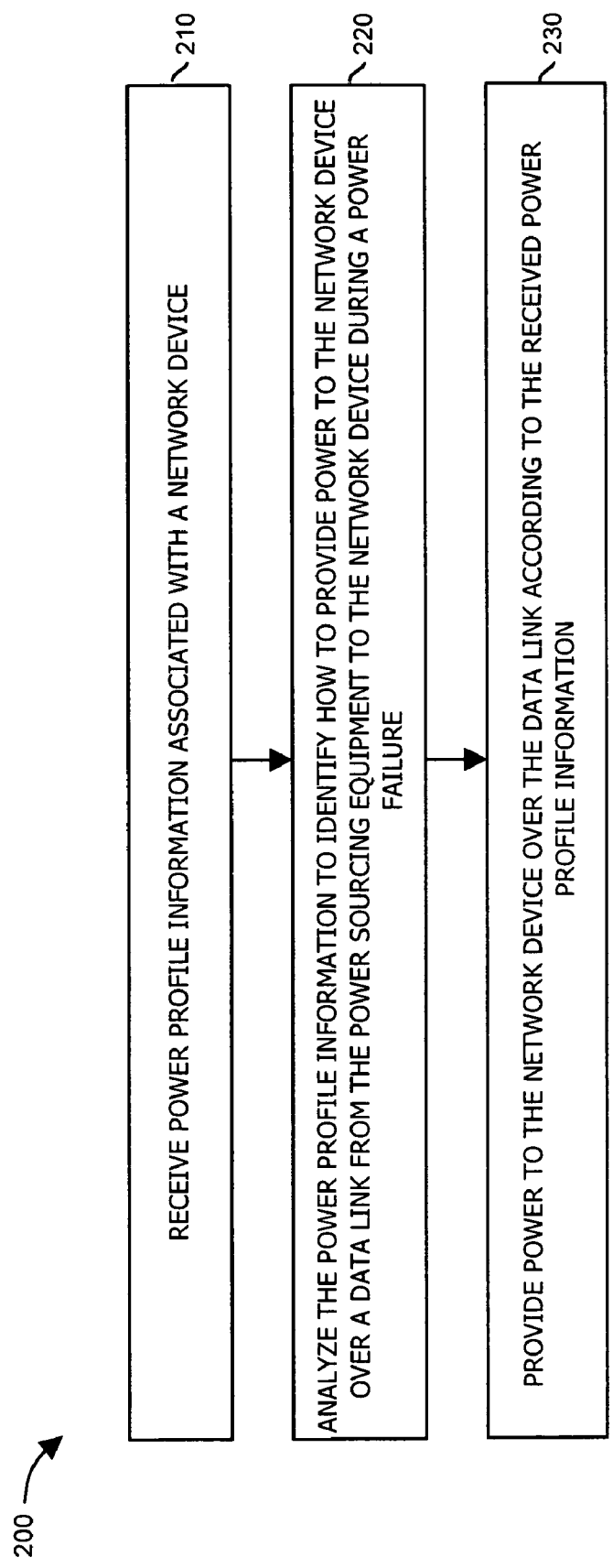
FIG. 2 is a flowchart depicting a method of distributing power to ports of power sourcing equipment according to an embodiment of the invention.

FIG. 2 is a flowchart 200 depicting an example method of provisioning power distribution through ports 155 of power sourcing equipment 110 to network devices 170 according to an embodiment of the invention.

In step 210, power sourcing equipment 110 receives power profile information 119 associated with network device 170-1.

In step 220, the power sourcing equipment 110 analyzes the power profile information 119 to identify how to provide power to the network device 170-1 over respective data link 160-1 from the power sourcing equipment 110 to the network device 170-1 during a power failure.

In step 230, the power sourcing equipment 110 provides power to the network device 170-1 over the data link 160-1 according to the received power profile information.

Based on use of the power profile information 119 and a power provisioning algorithm, the controller 112 can identify power requirements for network devices 170 so that the power sourcing equipment 110 can gracefully change attributes of a power signal supplied to a network device 170 over a respective link 160 when a qualifying event occurs. In other words, each of the network devices 170 may have different power requirements during different operating conditions. For example, some network devices 170 may not need to be powered during a failure event in which the power source 120 runs off of backup power supply 130, which has a limited capacity of energy to hold up power sourcing equipment 110. Other network devices 170 may require more power during a power failure, and so on. Maintaining and utilizing appropriate power profile information 119 for the network devices 170 enables controller 112 and power sourcing equipment 110 to provide appropriate power to network devices 170 under different operating conditions.

In certain cases, selectively reducing power from PSE 110 (based on the power profile information 119) to the network devices 170 enables the power sourcing equipment 110 to extend the amount of time that the power sourcing equipment 110 can provide power to network devices 170 having a higher associated priority such as a network telephone device, president's computer, smoke detectors, badge readers, security cameras, etc. that must work during a power outage. Lower priority network devices 170 may include flat panel displays, non-essential phones, laptop trickle chargers, etc. that are not provided power from the PSE 110 when primary power input 125 fails.

Figure 3:
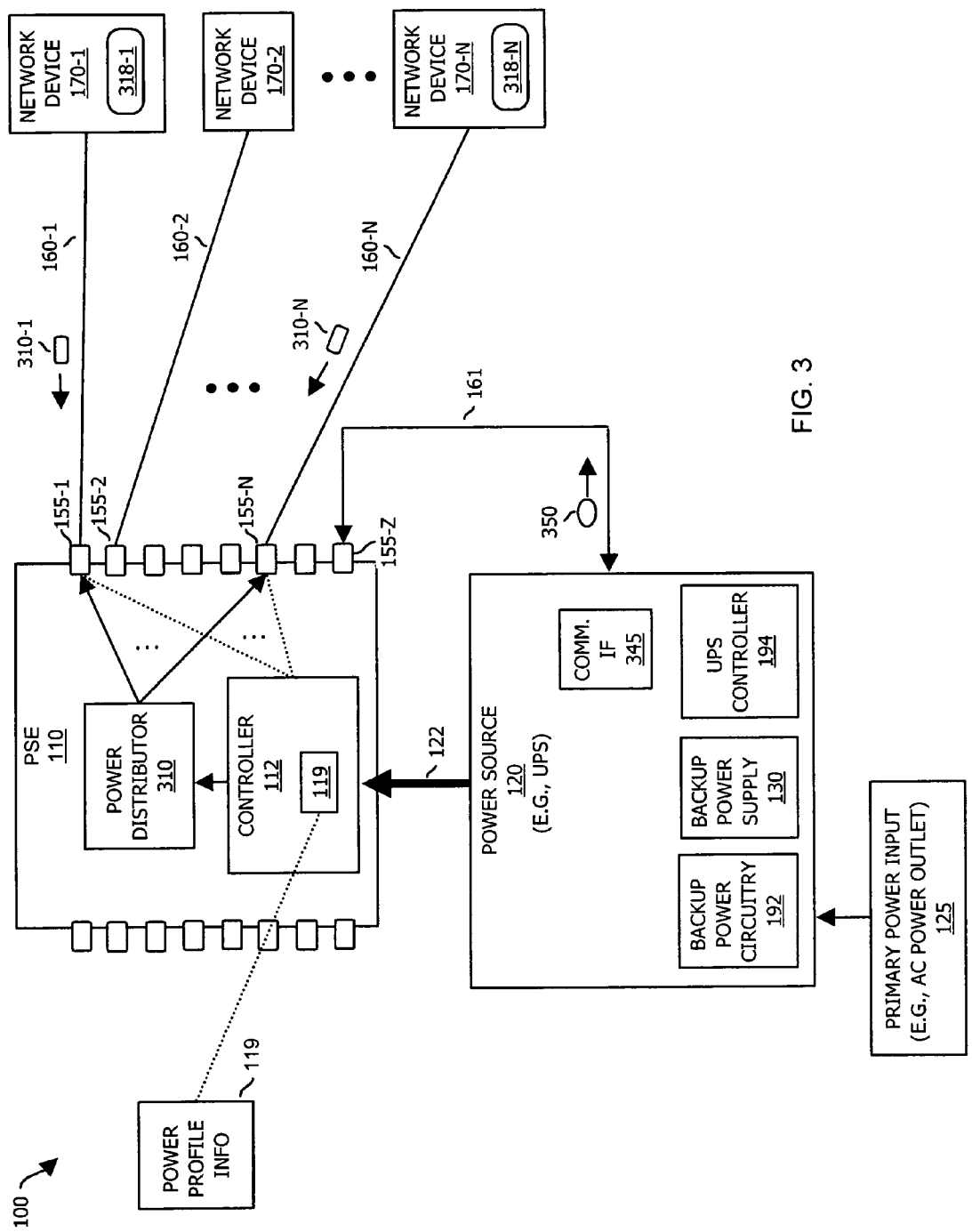
FIG. 3 is a detailed block diagram illustrating retrieval of power profile information from network devices according to an embodiment of the invention.

FIG. 3 is a detailed block diagram of power sourcing equipment 110 and corresponding power source 120 according to an embodiment of the invention. As shown, in addition to elements discussed with respect to FIG. 1, power sourcing equipment 110 in FIG. 3 illustrates a power distributor 310 coupled to controller 112. The power distributor 310 receives commands from controller 112 indicating which ports 155 and respective power levels to provide power through links 160 (e.g., Ethernet cables) and thus network devices 170 (PDs) during a power failure. FIG. 3 additionally illustrates that power source 120 includes a communication interface 345 for communicating over communication link 161.

Power source 120 includes backup power circuitry 192 (e.g., a switching power supply) that generates power signal 122 to power sourcing equipment 110 based on use of primary power input 125 (e.g., wall power) and, during a power outage of primary power input 125, backup power supply 130. Power source 120 includes a controller 194 that supports communication with controller 112 via respective PSE/PD communication link 161 and port 155 of power sourcing equipment 110. One type of message from power source 120 over link 161 indicates to power sourcing equipment 110 that the primary power input 125 has failed and that power source runs on backup power supply 130. In other words, power source 120 notifies power sourcing equipment 110 when a power failure condition occurs and that future power from power source 120 is potentially limited if the power outage lasts indefinitely. One application of communication link 161 involves use of an Ethernet based protocol such as SNMP (Simple Network Management Protocol) or CDP (Cisco Discovery Protocol) to support communication between the power sourcing equipment 110 and power source 120 so that the power sourcing equipment 110 can read the status of the power source 120 and control its features. In this case, PSE/PD communication link 161 is a conductor or set of conductors physically separated from a conductor used to convey power signal 122 from power source 120 to PSE 110.

Power source 120 monitors a status of primary power input 125 and backup power supply 130. During a power failure on primary power input 125, power source 120 generates and transmits messages 350 through communication interface 345 to controller 112 of power sourcing equipment 110 to notify the pose 110 of the power outage condition. In the alternative, power sourcing equipment 110 polls power source 120 regarding a power status and whether power source 120 presently relies on power from backup power supply 130 to generate power signal 122. As discussed, controller 112 selectively provides power to the network devices 170 based on power profile information 119.

In the embodiment shown in FIG. 3, one or more network devices 170 store and maintain their own respective power profile information 318. For example, network device 170-1 stores its respective power profile information 318-1, network device 170-N stores its respective power profile information 318-N, and so on. In this example, network device 170-2 does not include associated power profile information because network device 170-2 is not programmed to receive power from power sourcing equipment 110.

One event prompting the power sourcing equipment 110 to discover power profile information 318-1 associated with, for example, network device 170-1 is the act of a corresponding user plugging a network device 170-1 into link 160-1 and respective port 155-1 of the power sourcing equipment 110. In response to such an event, the power sourcing equipment 110 automatically utilizes one or more communication protocols (e.g., the 802.3af communication protocol, a proprietary Cisco communication protocol, etc.) to discover whether the network device 170-1 requires power over a respective port 155-1 to which the network device 170-1 is coupled. If appropriate, after discovery, the power sourcing equipment 110 supplies initial power to the newly connected network device 170-1. Thereafter, the PSE communicates via (a) Ethernet MAC address, (b) CDP (Cisco Discovery Protocol), (c) other protocol, or (d) other IP based information that is unique to the device to authenticate the device, validate its properties, and/or learn of a respective power profile 318-1 associated with respective network device 170-1.

Depending on a particular network system configuration, the PSE 110 can "pull" the power profile information from different sources. For example, in the embodiment shown in FIG. 3, network devices 170 (e.g., PDs), coupled to ports of the power sourcing equipment 110, locally store their own "mobile" power profile information 318. In one application, to setup the network device 170, a user enters his/her own power profile information 119 into a respective PD. For example, the user enters his/her power profile information 318 into a website that can automatically reprogram a respective network device to include the appropriate power profile information 318-1 for the respective network device 170. Alternatively, power profile information 318 of network devices 170 can be programmed in a factory, distributor, a network administrator, etc.

Maintaining the power profile information 318 in each of multiple network devices 318 in the above manner ensures that the power sourcing equipment 110 can find respective mobile power profiles (e.g., power profile information 318) because, to learn of power profile information 318 of the network devices 170, the power sourcing equipment 110 needs only to communicate directly with the network devices 170.

Figure 4:
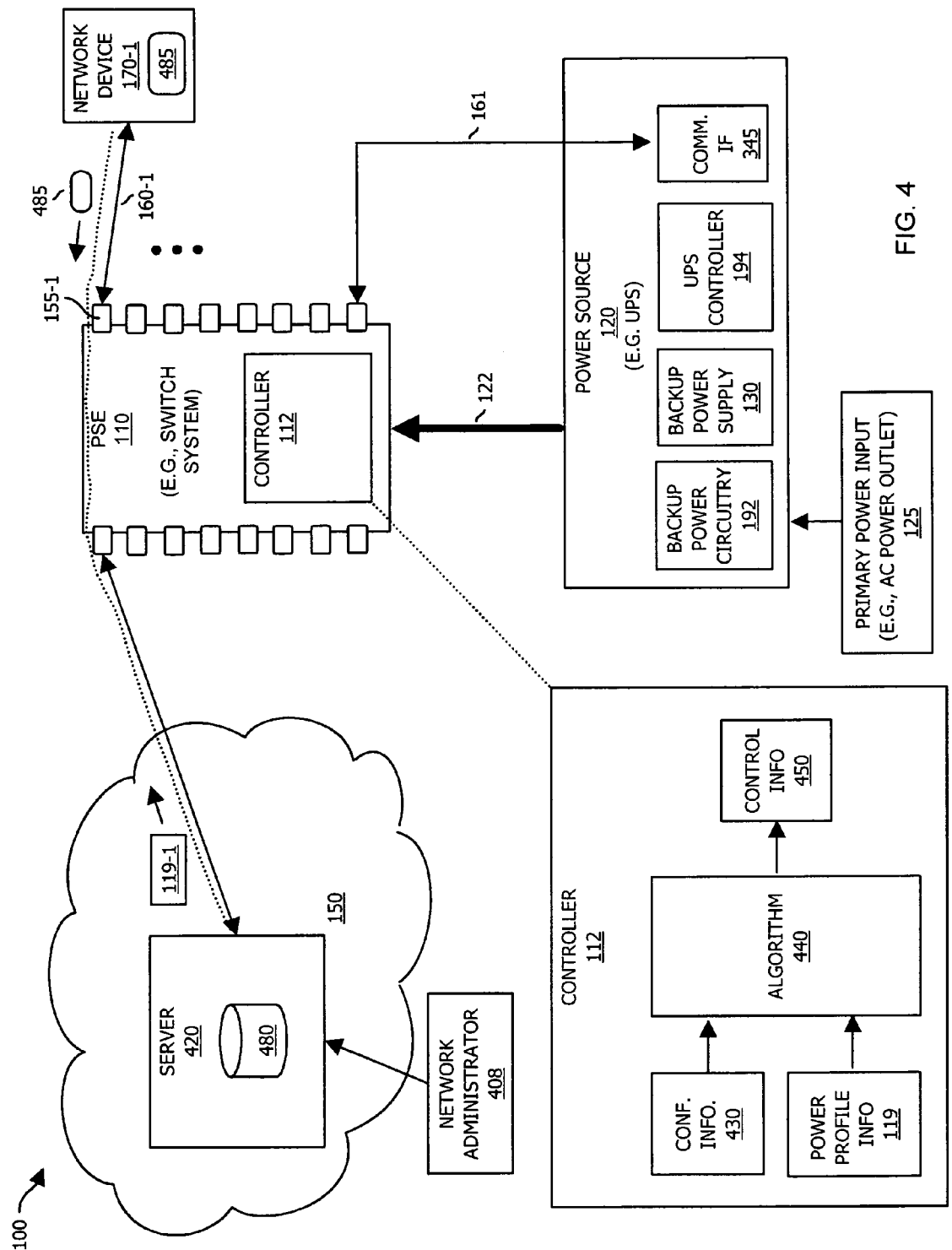
FIG. 4 is a diagram illustrating retrieval of power profile information from a network server based on an identifier associated with a network device according to an embodiment of the invention.

In an alternative embodiment, power sourcing equipment 110 communicates with a centralized location such as a server to receive power profile information 119 associated with one or more network devices 170 as in FIG. 4.

More particularly, FIG. 4 is a diagram illustrating a distribution of power profile information 119 according to an embodiment of the invention. As shown, in addition to power sourcing equipment 110, power source 120, network devices 170, and primary power input 125, communication system 100 includes network 150, server 420, and respective repository 480. Controller 112 includes configuration information 430, power profile information 119, algorithm 440, and configuration information 450.

In this embodiment, power profile information 119 associated with network devices 170 resides in a centralized network location such as a policy server accessible by the power sourcing equipment 110. That is, the power sourcing equipment 110 communicates with server 420 to retrieve power profile information 119 associated with the network devices 170 attached to ports 155. Thus, in comparison to the embodiment shown in FIG. 3, power profile information 119 need not be stored locally in respective network devices 170 as shown in FIG. 4.

Server 420 (e.g., policy server) can be programmed with the power profile information 119 in a number of ways. For example, in one application, a network administrator 408 enters the power profile information 119 associated with network devices 170 into repository 480 of server 420. In another application, the users enter their power profile information 119 into server 420 such as by logging onto a website that includes a mechanism to download power profile information 119 associated with a network device 170 to the centralized server 420.

When a user initially plugs network device 170-1 into link 160-1, power sourcing equipment 110 communicates with network device 170-1 to learn a unique identifier 485 (e.g., code, MAC address, IP address, key, etc.) associated with the network device 170-1. Power sourcing equipment 110 communicates the unique identifier 485 to server 420. Server 420 maps the unique identifier 485 to respective power profile information 119 in repository 480 associated with the corresponding network device 170-1 and forwards the power profile information 119 associated with network device 170-1 to controller 112 of power sourcing equipment 110.

Thus, one way of identifying a particular network device 170-1 coupled to a port of the power sourcing equipment 110 is to learn its unique identifier such as a MAC address, IP address, associated uniquely assigned key, etc. Based on learning the unique identifier 485 associated with a network device 170-1 when it is plugged into a power sourcing equipment 110, the power sourcing equipment 110 then communicates to retrieve the power profile information 119 from the repository 480 of network server 420. For example, according to one embodiment, the power sourcing equipment 110 initially communicates with one of the network devices 170 to learn of its MAC address. Thereafter, the PSE utilizes the MAC address to retrieve respective power profile information 119 associated with the network device 170-1 from the network server 420 to provision power.

A network administrator 408 can place the network devices' MAC addresses on a list that is shared throughout the network 150. This list can define members of a VLAN (Virtual Local Area Network) and respective members' power profile information 119.

As an alternative to using the MAC address to identify an end network device 170-1 and retrieve appropriate power profile information 119 for a network device 170-1, a higher layer communication protocol may be used between the power sourcing equipment 110 and network devices 170 such that a key exchange occurs between a power sourcing equipment 110 and a respective network device 170. For example, the key exchange would be an alternative method in which a key is emailed (from server 420, power sourcing equipment 110, etc.) to a user that programs his network device 170 with a received key. During operation, when the network device 170 communicates with the power sourcing equipment 110 after an initial discovery phase (e.g., when the power sourcing equipment 110 discovers that a network device 170 is connected to one of its ports 155), the network device 170 sends the key to the power sourcing equipment 110. The power sourcing equipment 110 receives the key from the network device 170 and verifies the network device's programmed key for authentication purposes. Accordingly, a power sourcing equipment 110 can provide proper power to the network device 170 based on use of authorized power profile information 119.

Controller 112 of power sourcing equipment 110 includes an algorithm 440 to process configuration information 430 (identifying which network devices 170 are currently coupled to respective ports of power sourcing equipment 110) and power profile information 119. For example, based on configuration information 430 and power profile information 119, algorithm 440 generates control information 450 indicating attributes (e.g., specifications) of power to be provided by the power sourcing equipment 110 to the network devices 170 during different operating conditions such as during a power outage.

Thus, in the context of communication system 110 as in FIGS. 3 and 4, power profile information 119 associated with a network device, user, (or other entity) can be stored in a repository such as in the network device itself (e.g., the PD) or in a network server.

Prior to modifying attributes of power signals from power sourcing equipment 110 to network devices 170 based on the retrieved power profile information 119 and in response to detecting a power outage, the power sourcing equipment 110 can initiate notification to respective users of the network devices 170 of the power outage condition and that certain lower priority network devices (according to the power profile information 119) will eventually no longer be provided power through a respective port 155 of the power sourcing equipment 110. Consequently, a user of the network device 170 can be proactive and save data to storage before losing power provided by the power sourcing equipment 110. Accordingly, after transitioning over to backup power supply 130 and running on backup power supply 125 for some time, power sourcing equipment 110 provides continued power to ports 155 of the power sourcing equipment 110 for a duration of time before selectively discontinuing distribution of power to lower priority ports of the power sourcing equipment 110 in favor of higher priority ports.

Figure 5:
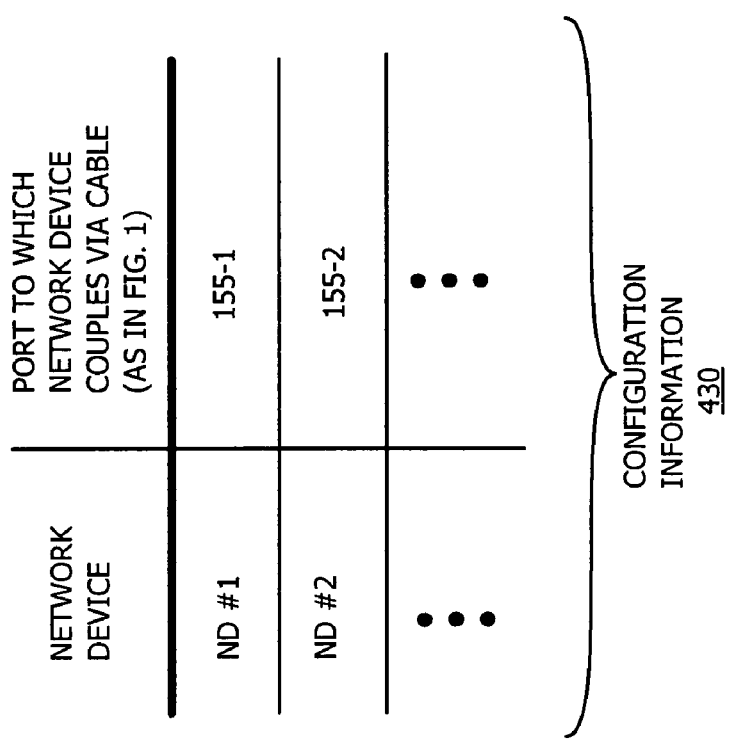
FIG. 5 is a diagram of configuration information according to an embodiment of the invention.

FIG. 5 is a diagram more particularly illustrating sample configuration information 430 according to an embodiment of the invention. As shown, configuration information 430 identifies network devices 170 and corresponding ports 155 to which the network devices 170 are coupled via respective links 160. For example, as shown in FIG. 1 and as identified by configuration information 430, network device 170-1 (i.e., ND #1) couples through link 160-1 to port 155-1 of power sourcing equipment 110; network device 170-2 (i.e., ND #2) couples through link 160-2 to port 155-2 of power sourcing equipment 110; and so on. As mentioned, power sourcing equipment 110 and, more specifically, controller 112 utilizes the configuration information 430 received from network administrator 408 to identify which network devices 170 are connected to ports 155 of power sourcing equipment 110. In an other embodiment, power sourcing equipment 110 learns of which network devices 170 are attached to its ports 155 based on direct communications with the network devices 170 as previously discussed.

FIG. 6 is an example diagram of control information 450 generated by algorithm 440 according to an embodiment of the invention. As shown, control information 450 includes a list of network devices 170 (or a user) and corresponding configuration settings (e.g., control information) to be used and applied during a power failure mode. For example, network device 170-1 (i.e., ND #1) has associated power profile information 119-1 indicating that it has a priority class rating of 2, a backup power requirement time of 1 hour, and power consumption requirements of 150 watts; network device 170-2 (i.e., ND #2) has no associated power profile information; network device 170-3 (i.e., ND #3) has associated power profile information 119-3 indicating that it a priority class rating of 5, a backup power requirement time of 5 minutes, and power consumption requirements of 220 watts; and so on. In this example, priority class 1 network devices 170 are afforded higher priority than priority class 2 network devices 170; priority class 2 network devices 170 are afforded higher priority than priority class 3 network devices 170; and so on. Note that the specifications in backup power control information 450 associated with a respective network device 170 is merely an example of possible information to be associated with a network device 170 and such a list can include other types of power specification information as well.

Referring again to the embodiments of the invention in FIGS. 3 and 4, regardless of whether the power sourcing equipment 110 receives power profile information 119 from the network device 170, a server 420, locally from the power sourcing equipment 110, or some other remotely located repository, use of power profile information 119 enables a user to plug into different ports of a potentially expansive network including one or more PSEs while still being provided appropriate power during different operating conditions. This technique of configuring a power sourcing equipment 110 to dynamically provision power to its ports 155 based on learned power profile information 119 of one or more end devices reduces recurring network administration costs because a network administrator 408 no longer needs to manually reprogram how a power sourcing equipment 110 shall provide power (e.g., during a power failure) to its respective ports 155 each time a user plugs a network device 170 into a different port 155 of power sourcing equipment 110. Instead, as discussed, the power sourcing equipment 110 automatically retrieves and utilizes "mobile" power profile information 119 associated with network devices 170 to identify how to provision power from the power sourcing equipment 110 to the attached network devices 170.

Automating retrieval of "mobile" power profile information eliminates the need of one or multiple power sourcing equipment such as switches from having to know a topology of an entire network to deliver special power specifications to different network devices 170. Accordingly, end devices can be provided continuous power even during a power failure when a UPS runs on backup power.

Also, note that a capacity of backup power supply 130 (e.g., a UPS) may not always be able to provide unlimited, continuous power to a power sourcing equipment 110. This may be intentional due to prioritization of certain devices/ports over others, or unintentional due to perhaps a human error occurring when reconfiguring the system. Automating a technique of learning the power requirements associated with network devices 170 enables the power sourcing equipment 110 or UPS with which the power sourcing equipment 110 communicates to continuously update a current load profile (e.g., based on supported network devices 170 and their power requirements) of the power sourcing equipment 110 to determine whether or not available backup power will be oversubscribed during a power outage. Accordingly, techniques of the invention reduce a possibility of a power sourcing equipment 110 accidentally oversubscribing power to the network devices 170.

Further techniques of the invention include a policing mechanism so that hackers cannot modify and/or retrieve power profile information 119 without proper authorization. For example, in one embodiment, the policing mechanism enables a network administrator 408 to control who is allowed access to and can modify stored power profile information 119 in server and/or network devices 170. In another embodiment, the policing mechanism includes a password given to a user to enable the user to program power profile information into their PD or download power profile information 119 through a website as mentioned.

The validation/authentication mechanism of the present invention supports authentication of a device and validation of its respective power profile properties for security purposes. For example, validation/authentication can be achieved based on use of an assigned password that is communicated to a user or MAC address of the network device. If the network administrator wishes to prevent someone from deviously reprogramming their MAC address for the purpose of making an unauthorized change to their respective power profile information, it may be preferred to initiate use of a secure password provided by the user to authenticate and validate the device/user for a particular power profile information.

Figure 7:
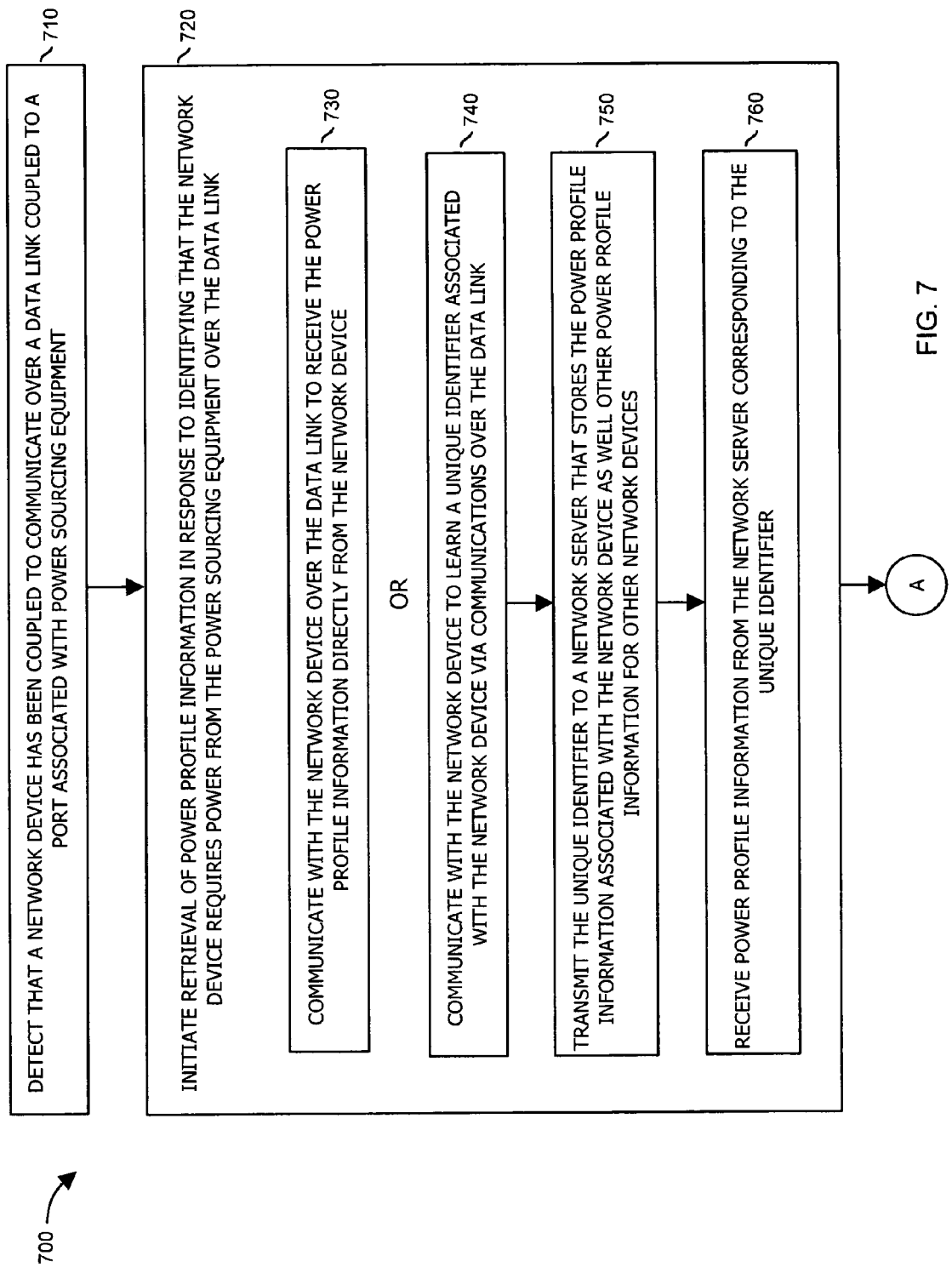
FIGS. 7 and 8 combine to form a flowchart illustrating a process flow according to an embodiment of the invention.
Figure 8:
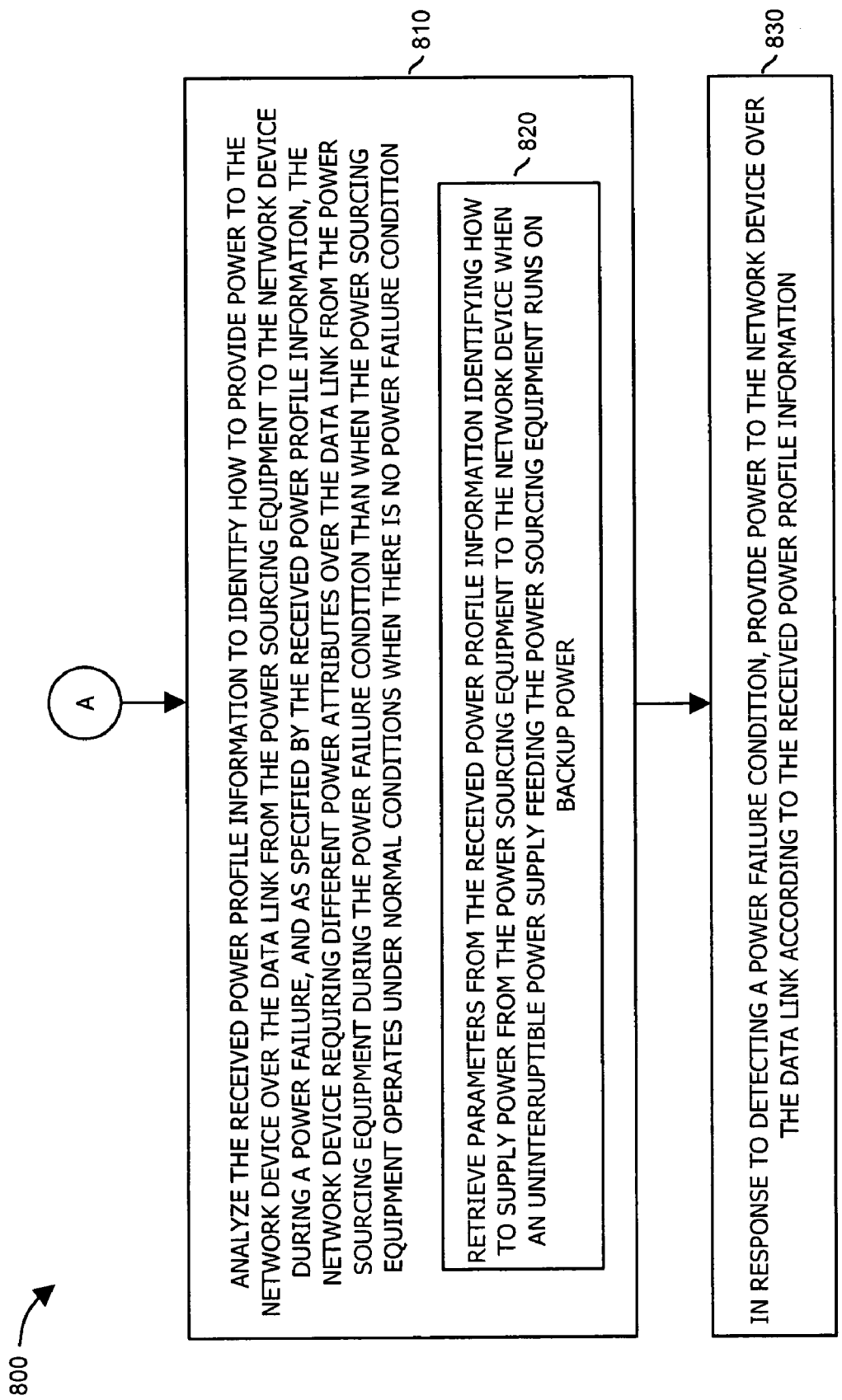

FIGS. 7 and 8 combine to form an example flowchart depicting methods of provisioning power distribution through ports 155 of a power sourcing equipment 110 to network devices 170 according to an embodiment of the invention. Certain techniques illustrated by the flowcharts have already been discussed with respect to the previous figures.

In the flowchart 700 of FIG. 7, in step 710, power sourcing equipment 110 detects that a network device 170-1 has been coupled to communicate over a data link 160-1 coupled to a port 155-1 associated with power sourcing equipment 110.

In step 720, power sourcing equipment 110 initiates retrieval of power profile information 119 in response to identifying that the network device 170-1 requires power from the power sourcing equipment 110 over the data link 160-1.

In substep 730 of step 720, power sourcing equipment 110 communicates with the network device 170-1 over the data link 155-1 to receive the power profile information 119 directly from the network device 170-1.

In the alternative to substep 730, in substep 740, power sourcing equipment 110 communicates with the network device 170-1 to learn a unique identifier associated with the network device 170-1 via communications over the data link 155-1.

In substep 750, power sourcing equipment 110 transmits the unique identifier to a network server 420 that stores the power profile information 119 associated with the network device 170-1 as well other power profile information 119 for other network devices 170.

In step 760, power sourcing equipment 110 receives power profile information 119 from the network server 420 corresponding to the unique identifier associated with network device 170-1.

In step 810 as shown in flowchart 800 of FIG. 8, regardless of whether power sourcing equipment 110 receives the power profile information 119 from the network device 170-1 or server 420, power sourcing equipment 110 analyzes the received power profile information 119 associated with network device 170-1 to identify how to provide power to the network device 170-1 over the data link 155-1 from the power sourcing equipment 110 to the network device 170-1 during a power failure, and as specified by the received power profile information 119, the network device 170-1 requiring different power attributes of a power signal over the data link 155-1 from the power sourcing equipment 110 during the power failure condition than when the power sourcing equipment 110 operates under normal conditions when there is no power failure condition.

In substep 820 of step 810, power sourcing equipment 110 retrieves parameters from the received power profile information 119 identifying how to supply power from the power sourcing equipment 110 to the network device 170-1 when an uninterruptible power supply feeding the power sourcing equipment 110 runs on backup power.

In step 830, power sourcing equipment 110, in response to detecting a power failure condition, provides power to the network device 170-1 over the data link 155-1 according to specifications in the received power profile information 119.

Figure 9:
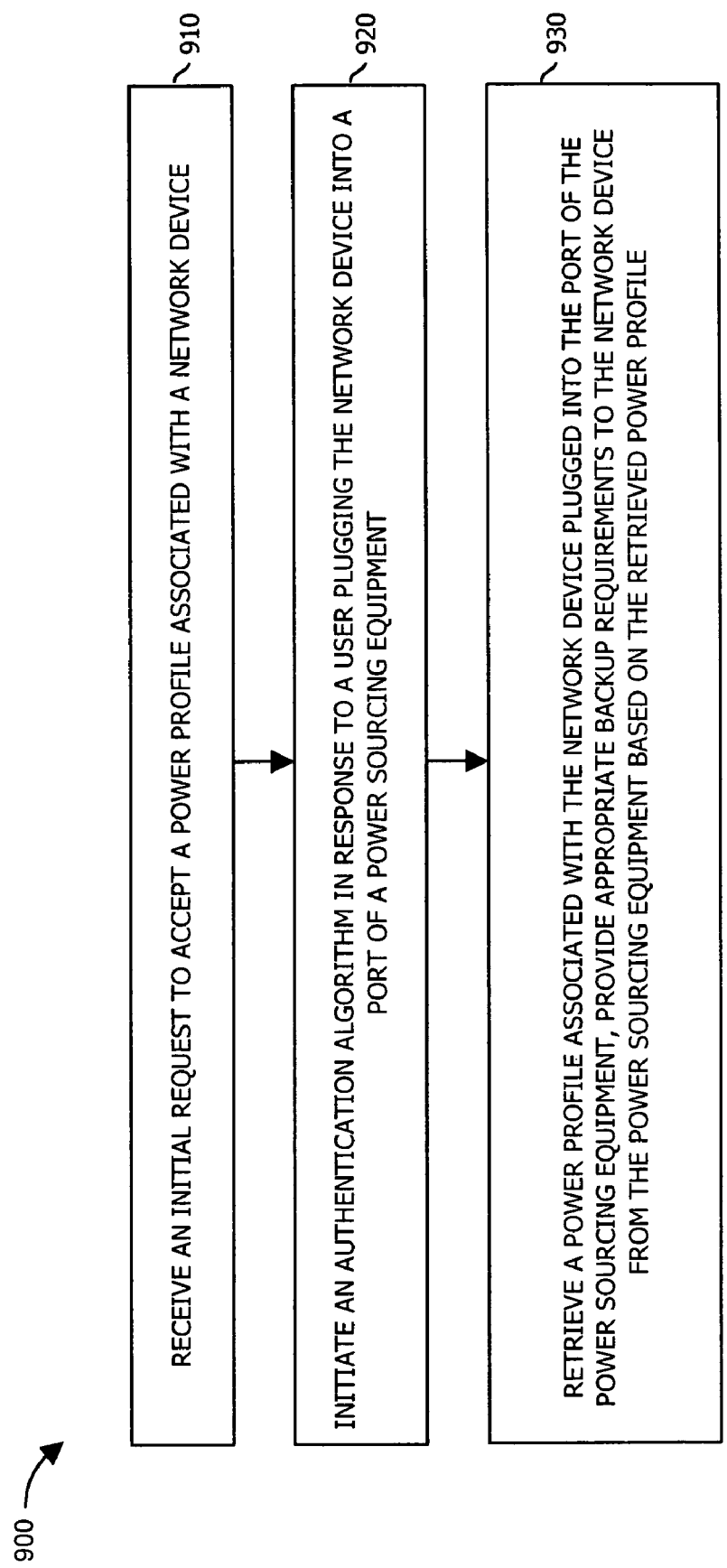
FIG. 9 is a flowchart illustrating additional processing techniques according to one configuration of the invention.

FIG. 9 is a flowchart 900 illustrating a technique of utilizing a profile according to one configuration of the invention. In general, step 910 in flowchart 900 is performed once, steps 920 and 930 automatically repeat every time a respective one of the network devices 170 is plugged or unplugged from a respective port 150 of power sourcing equipment 110. Conventional techniques must be manually repeated each time a plug/unplug event occurs. Also, in a conventional switch system, old backup power information has to be deprogrammed from the switch and port that the network device 170 is unplugged.

Now, referring to specific steps in flowchart 900, in step 910, a first process associated with communication system 100 involves receiving an initial request to accept a power profile. That is, a user of corresponding network device 170 requests a certain level of power backup through a website, email, or manually programming as previously discussed. A network administrator then approves or denies the initial request for a backup profile. This can be a "one time" event unlike conventional systems.

In step 920, a second process associated with communication system 100 involves authentication that occurs when a user plugs into a new port of power sourcing equipment 110. Authentication by power sourcing equipment 110 may be performed via the unique MAC address that was associated with the profile in step 910 or other unique key. The main technique in this step is to provide a security check to ensure that a newly attached network device attaching to the power sourcing equipment 110 is who the corresponding network device claims to be or that the profile associated with the network device that will be later accessed by the power sourcing equipment 110 is authentic.

In step 930, according to a third process associated with communication system 110, a power profile associated with a network device can be communicated to the power sourcing equipment in a number of ways as discussed. For example, a profile can be communicated from the respective network device to the power sourcing equipment 110 based on a protocol such as CDP (Cisco Discovery Protocol), MAC frames, IP, etc. A profile also can be downloaded from a central policy server programmed by a network administrator 408. Also, a policy can be downloaded from a server that has been programmed by a user of the network device. Based on a profile of a network device attached to a respective switch port of power sourcing equipment 110, the power sourcing equipment 110 provides appropriate power backup requirements.

When a network device is unplugged from a respective port of the power sourcing equipment 110, the power sourcing equipment 110 no longer provides power to the respective port according to the previously used profile. Instead, when power sourcing equipment 110 detects a new network device, power sourcing equipment 110 repeats the above steps to retrieve a power profile and provide backup power. Conventional techniques such as those employed along with POE or PBX systems require manual disablement of the profile.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In power sourcing equipment that manages distribution of power and data over a network, a method comprising:
   receiving power profile information associated with a network device;
   analyzing the power profile information to identify how to provide power to the network device over a data link from the power sourcing equipment to the network device during a power failure; and
   providing power to the network device over the data link according to an analysis of the received power profile information wherein analyzing the power profile information results in:
   learning how to provision power to the network device during normal operating conditions of the power sourcing equipment;
   learning how to provision power to the network device during a power outage in which a power source supplying power to the power sourcing equipment runs on backup power rather than failed primary wall power; and
   wherein the power profile information indicates that the network device demands less power from the power sourcing equipment over the data link during the power failure than when the power sourcing equipment operates under normal conditions when there is no power failure;
   wherein prior to receiving the power profile information associated with the network device comprises:
   detecting that the network device has been coupled to the power sourcing equipment over a data link;
   identifying that the network device requires power from the power sourcing equipment; and
   initiating retrieval of the power profile information over the data link in response to detecting that the network device has been coupled to communicate over the data link.

2. A method as in claim 1, wherein analyzing the power profile information includes:
   retrieving a parameter from the received power profile information identifying how to supply power from the power sourcing equipment to the network device when an uninterruptible power supply feeding the power sourcing equipment runs on backup power; and
   based on the parameter, providing power from the power sourcing equipment to the network device when the uninterruptible power supply runs on battery backup.

3. A method as in claim 1, wherein analyzing the power profile information includes:
   retrieving a parameter from the received power profile information identifying whether the network device can tolerate at least temporary downtime during which the power sourcing equipment is not required to provide power to the network device over the data link when an uninterruptible power supply feeding the power sourcing equipment runs on backup power instead of a primary power source; and
   based on the parameter, providing power from the power sourcing equipment to the network device when the uninterruptible power supply runs on battery backup.

4. The method of claim 1, wherein providing power to the network device over the data link according to the analysis of the received power profile information comprises:
   providing a first amount of power to the network device when the power source supplying power to the power sourcing equipment runs on primary wall power; and
   providing a second amount of power to the network device, according to the power profile information, in response to detecting the power source, supplying power to the power sourcing equipment, running on backup power, the second amount of power being different from the first amount of power.

5. A method as in claim 1, wherein initiating retrieval of the power profile information includes communicating with the network device over the data link to retrieve the power profile information directly from the network device.

6. A method as in claim 1, wherein initiating retrieval of the power profile information includes communicating with a network server that stores the power profile information at a remote location with respect to the network device.

7. A method as in claim 1, wherein receiving power profile information associated with the network device includes:
   learning a unique identifier associated with the network device via communications over the data link, the unique identifier being at least one of:
   i) a MAC (Media Access Control) address,
   ii) an IP (Internet Protocol) address,
   iii) a key, and
   iv) a code associated with the network device;
   communicating the unique identifier to a network server that stores the power profile information associated with the network device as well other power profile information for other network devices; and receiving power profile information from the network server corresponding to the unique identifier.

8. A method as in claim 1, wherein receiving the power profile information associated with the network device includes:

transmitting a communication to the network device over the data link prompting a user of the network device to supply an appropriate password to activate use of the power profile information at the power sourcing equipment to provision power to the network device; and activating use of the power profile information to provision power over the data link from the power sourcing equipment to the network device in response to acknowledging receipt of the appropriate password from the user.

9. The method of claim 1, wherein:

detecting that the network device has been coupled to the power sourcing equipment over a data link comprises detecting that the network device has been coupled to the power sourcing equipment over a data link in response to the network device having been plugged into a link and respective port of the power sourcing equipment; and initiating retrieval of the power profile information over the data link in response to detecting that the network device has been coupled to communicate over the data link comprises initiating retrieval of the power profile information over the data link in response to detecting that the network device has been coupled to the power sourcing equipment over the data link in response to the network device having been plugged into the data link and respective port of the power sourcing equipment.

10. An apparatus for provisioning power over a network, the apparatus comprising:

power sourcing equipment that manages distribution of power and data over a network to a set of network devices, ports of the power sourcing equipment being connected to the set of network devices through respective cables;

a controller associated with the ports of the power sourcing equipment, the controller supporting operations of:

receiving power profile information associated with a network device coupled to a given port of the power sourcing equipment;

analyzing the power profile information to identify how to provide power, during a power failure condition, to the network device over a data link formed by a respective cable from the power sourcing equipment to the network device; and providing power to the network device over the data link according to the received power profile information wherein analyzing the power profile information results in:

i) learning how to provision power to the network device during normal operating conditions of the power sourcing equipment;

ii) learning how to provision power to the network device during a power outage in which a power source supplying power to the power sourcing equipment runs on backup power rather than failed primary wall power; and iii) the power profile information indicating that the network device demands less power from the power sourcing equipment over the data link during the power failure than when the power sourcing equipment operates under normal conditions when there is no power failure;

wherein prior to receiving the power profile information associated with the network device, the controller supports operations of:

detecting that the network device has been coupled to the power sourcing equipment over a data link;

identifying that the network device requires power from the power sourcing equipment; and initiating retrieval of the power profile information over the data link in response to detecting that the network device has been coupled to communicate over the data link.

11. An apparatus as in claim 10, wherein the power sourcing equipment is a switch device and wherein analyzing the power profile information includes:

retrieving a parameter from the received power profile information identifying how to supply power from the power sourcing equipment to the network device when an uninterruptible power supply feeding the power sourcing equipment runs on backup power; and based on the parameter, providing power from the power sourcing equipment to the network device when the uninterruptible power supply runs on battery backup.

12. The apparatus as in claim 10, wherein:

detecting that the network device has been coupled to the power sourcing equipment over a data link comprises detecting that the network device has been coupled to the power sourcing equipment over a data link in response to the network device having been plugged into a link and respective port of the power sourcing equipment; and initiating retrieval of the power profile information over the data link in response to detecting that the network device has been coupled to communicate over the data link comprises initiating retrieval of the power profile information over the data link in response to detecting that the network device has been coupled to the power sourcing equipment over the data link in response to the network device having been plugged into the data link and respective port of the power sourcing equipment.

13. A method as in claim 10, wherein initiating retrieval of the power profile information includes communicating with the network device over the data link to retrieve the power profile information directly from the network device.

14. An apparatus as in claim 10, wherein receiving power profile information associated with the network device includes:

learning a unique identifier associated with the network device via communications over the data link;

communicating the unique identifier to a network server that stores the power profile information associated with the network device as well other power profile information for other network devices; and receiving power profile information from the network server corresponding to the unique identifier.

15. An apparatus as in claim 10, wherein receiving the power profile information associated with the network device includes:

i) transmitting a communication to the network device over the data link prompting a user of the network device to supply an appropriate password to activate use of the power profile information at the power sourcing equipment to provision power to the network device; and ii) activating use of the power profile information to provision power over the data link from the power sourcing equipment to the network device in response to acknowledging receipt of the appropriate password from the user.

16. A system comprising:

multiple network devices;

power sourcing equipment that provides power and data over multiple respective data links of a network to the multiple network devices;

a power source that provides power to the power sourcing equipment; and the power sourcing equipment provisioning power to the multiple network devices over the respective data links depending on power profile information associated with the multiple network devices, the power profile information indicating how to provision power from the power sourcing equipment to the multiple network devices during a power failure condition;

wherein at least a portion of the power profile information associated with the multiple network devices indicates that at least one of the multiple network devices demands different power attributes over the data link from the power sourcing equipment during the power failure condition than when the power sourcing equipment operates under normal conditions when there is no power failure condition wherein prior to receiving the power profile information associated with the multiple network device, the power sourcing equipment is configured to:

detect that the network device has been coupled to the power sourcing equipment over a data link;

identify that the network device requires power from the power sourcing equipment; and initiate retrieval of the power profile information over the data link in response to detecting that the network device has been coupled to communicate over the data link.

17. The system as in claim 16, wherein:

when detecting that the network device has been coupled to the power sourcing equipment over a data link, the power sourcing equipment is configured to detect that the network device has been coupled to the power sourcing equipment over a data link in response to the network device having been plugged into the date link and respective port of the power sourcing equipment; and when initiating retrieval of the power profile information over the data link in response to detecting that the network device has been coupled to communicate over the data link the power sourcing equipment is configured to initiating retrieval of the power profile information over the data link in response to detecting that the network device has been coupled to the power sourcing equipment over the data link in response to the network device having been plugged into the data link and respective port of the power sourcing equipment.

18. A system as in claim 16, wherein the power source supplying power to the power sourcing equipment is an uninterruptible power supply and the power sourcing equipment provisions power, based on the power profile information, to the multiple network devices during a power failure in which the uninterruptible power supply runs on backup rather than primary power.

19. A system as in claim 18 further comprising:

a server from which the power sourcing equipment receives the power profile information; and wherein users enter power profile information associated with their respective network devices to the server by downloading the power profile information via input to a website.

20. A system as in claim 16, wherein at least a portion of users of the multiple network devices receive respective keys via e-mail messages, and the users program their respective network devices with the respective keys, the power sourcing equipment communicating with the multiple network devices to learn of the respective keys as programmed by the users and identify corresponding power profile information for provisioning power to the multiple network devices.

* * * * *